(12) United States Patent
Ito et al.

(10) Patent No.: US 6,193,600 B1
(45) Date of Patent: Feb. 27, 2001

(54) AIR PASSAGE SWITCHING SYSTEM FOR AIR CONDITIONER

(75) Inventors: Masahiro Ito, Takahama; Kousei Banno, Obu, both of (JP)

(73) Assignees: Denso Corporation; Shimizu Industry Co., Ltd., both of Kariya (JP)

( * ) Notice: Subject to any disclaimer, the term of this patent is extended or adjusted under 35 U.S.C. 154(b) by 0 days.

(21) Appl. No.: 09/379,873

(22) Filed: Aug. 24, 1999

(30) Foreign Application Priority Data

Aug. 25, 1998 (JP) .................................................. 10-239029
Jul. 23, 1999 (JP) .................................................. 11-209587

(51) Int. Cl.$^7$ .................................................. B24D 13/00
(52) U.S. Cl. ............................. 454/69; 49/483.1; 49/504
(58) Field of Search ...................... 454/69, 121; 251/306, 251/317; 49/475.1, 483.1, 504, 42, 46

(56) References Cited

U.S. PATENT DOCUMENTS

| | | | |
|---|---|---|---|
| 3,308,745 | * | 3/1967 | Davies ................................. 454/304 |
| 4,402,586 | * | 9/1983 | Jacquet ................................ 251/306 |
| 4,492,361 | * | 1/1985 | Jacquet et al. ....................... 251/356 |
| 5,669,350 | * | 9/1997 | Altmann et al. ..................... 123/337 |

* cited by examiner

Primary Examiner—Stephen Gravini
Assistant Examiner—Jiping Lu
(74) Attorney, Agent, or Firm—Harness, Dickey & Pierce, PLC (57) ABSTRACT

An air passage switching system includes a case forming an air passage having an opening portion, and a butterfly door for opening and closing the opening. The door includes a door body portion made of a material having a high rigidity, and a seal member attached to the door body. The seal member is made of an elastic material, and is formed into a thin-plate shape to extend from an outer peripheral portion of the door body portion toward an outer side. The seal member of the door is press-fitted to a case seal surface around the opening portion along a seal line (D), so that the opening portion is closed. The door is set in such a manner that an inner peripheral curvature radius ($R_{C2}$) of a corner portion of the case seal surface on the seal line is larger than an outer peripheral curvature radius ($R_D$) of the seal member on the corner portion. Thus, the air passage switching system prevents air leak due to a deformation of the seal member while being produced in low cost.

11 Claims, 9 Drawing Sheets

AIR PASSAGE SWITCHING SYSTEM FOR AIR CONDITIONER

CROSS-REFERENCE TO RELATED APPLICATION

This application relates to and claims priority from Japanese Patent Applications No. Hei. 10-239029 filed on Aug. 25, 1998, and No. Hei. 11-209587 filed on Jul. 23, 1999, the contents of which are hereby incorporated by reference.

BACKGROUND OF THE INVENTION

1. Field of the Invention

The present invention relates to an air passage switching system having a door for opening and closing an air passage through which air flows. The air passage switching system is suitable for an air outlet mode switching unit for a vehicle air conditioner.

2. Related Art

Figure 15A:
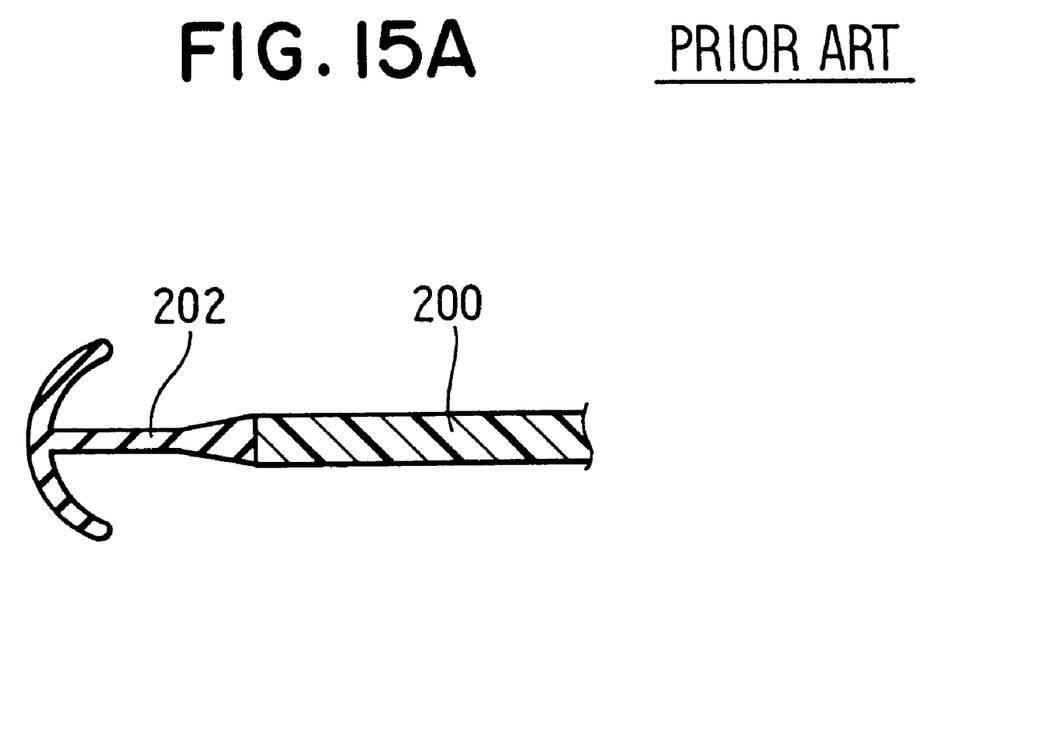
FIGS. 15A, 15B are partial sectional views showing conventional seal members of butterfly doors, respectively.
Figure 15B:
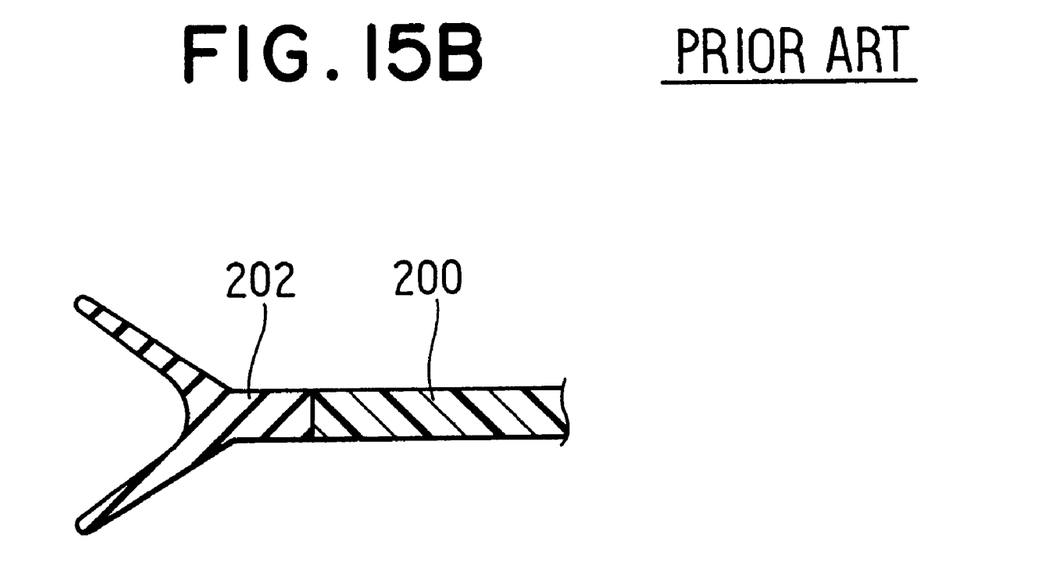

A conventional air passage switching system for an air conditioner of a vehicle has an air conditioning case for forming an air passage, and a butterfly door for switching the air passage. A rotation shaft for rotating the butterfly door is disposed at side end centers of the door. The butterfly door is rotatably held in the air conditioning case to be rotated by the rotation shaft. The butterfly door includes a door body portion made of resin having a high rigidity, and a lip-seal like seal member made of an elastomer. The seal member is formed into a thin-plate like (i.e., flat sheet) integrally with the door body portion on the outer peripheral portion of the door body portion. However, because the seal member is formed into the thin-plate like to have a low rigidity, the seal member is readily deformed due to inner shrinking force, and is readily bent upwardly on a corner portion. To prevent this problem, when a seal member 202 is formed into a lip like having a T-shaped or Y-shaped end section around a door body portion 200 as shown in FIGS. 15A, 15B, the rigidity of the seal member 202 is increased, and the seal member 202 is not readily deformed. However, it is compared with the seal member formed into a thin-plate like, the T-shaped or Y-shaped end section is difficult to be molded, and the producing cost of the seal member 202 is increased. Further, the thickness of the top end of the seal member 202 becomes larger due to the T-shaped or Y-shaped end section, an area of an air passage is reduced and pressure loss of the air passage is increased when the door is opened.

SUMMARY OF THE INVENTION

In view of the foregoing problems, it is an object of the present invention to provide an air passage switching system which opens and closes an air passage by using a door where a thin and flat plate-like seal member made of an elastic material is attached to an outer peripheral portion of a door body. In the air passage switching system, the door is produced in low cost while preventing air leak due to deformation of the seal member.

According to the present invention of the present invention, an air passage switching system includes a door for opening and closing an opening of a case. The door includes a door body made of a material having a rigidity higher than a predetermined value, and a seal member made of an elastic material having a heat contraction and being attached to an outer peripheral portion of the door body. The seal member continually extends from the outer peripheral portion of the door body toward an outer side to have a thin plate-like shape. In the air passage switching system, the case has a case seal surface around the opening, the seal member of the door is press-fitted to the case seal surface to have a predetermined deformation amount when the opening is closed, the seal member has inner stress (i.e., inner contracting force) generated during molding, and the seal member and the case seal surface are provided in such a manner that the predetermined deformation amount of the seal member when the seal member is press-fitted to the case seal surface is made larger than a deformation amount of the seal member due to the inner stress. Thus, even when the door is used in a long time and the seal member is deformed due to the inner shrinking force, a clearance is not caused between the case seal surface of the case and the door so that air leak can be accurately prevented, because the deformation amount of the seal member when the seal member is press-fitted to the case seal surface is larger than the deformation amount due to the inner shrinking force. Further, because the seal member is formed into the thin plate like, the air passage switching system is produced in low cost while accurately preventing the air leak.

Preferably, on a corner portion of the seal member, the seal member and the case seal surface are provided in such a manner that the deformation amount of the seal member when being press-fitted to the case seal surface is made larger than the deformation amount of the seal member due to the inner stress. Therefore, on the corner portion of the seal member, the air leak due to deformation of the seal member can be effectively prevented.

More preferably, the seal member has an outer peripheral curvature radius ($R_D$) on a corner portion, the seal member is press-fitted to the case seal surface along a seal line when the opening is closed, the case seal surface has an inner peripheral curvature radius ($R_{C2}$) on a corner portion of the seal line, corresponding to the corner portion of the seal member, and the inner peripheral curvature radius ($R_{C2}$) is set to be larger than the outer peripheral curvature radius ($R_D$). Therefore, when the opening is closed, an inner peripheral portion of the case seal surface tightly contacts the seal member on the corner portion. That is, the corner portion of the seal member can be beforehand elastically deformed from an initial using time by an elastic deformation amount larger than the deformation amount due to the inner shrinking force. Thus, the air leak due to the inner shrinking force can be further prevented.

Still more preferably, the inner peripheral curvature radius ($R_{C2}$) is set to be in a range of 1.5 $R_D$–4 $R_D$, relative to the outer peripheral curvature radius ($R_D$). Therefore, the clearance between the case seal surface of the case and the door can be further prevented, and an interference between the case seal surface and the door body can be prevented.

Further, a corner portion of the door body corresponding to the corner portion of the seal member has a protrusion protruding toward the corner portion of the seal member. Therefore, the protrusion dimension of the seal member on the corner portion can be reduced by the protrusion amount of the protrusion of the door body. Accordingly, an upwardly bent amount of the seal member on the corner portion can be reduced, and deformation of the seal member on the corner portion due to dynamical pressure of blown-air can be reduced. As a result, the air leak on the corner portion can be effectively prevented. Further, because the door body portion including the protrusion is made of a material having a high rigidity, the rigidity of the seal member on the corner portion can be improved by the protrusion, and the deformation of the seal member due to the inner shrinking force on the corner portion can be effectively prevented.

Preferably, the protrusion protruding toward the corner portion of the seal member has a smoothly curved outer surface. Therefore, stress with the door opening-closing operation is not collected in the corner portion of the seal member, and the bonding performance between the seal member and the door body can be maintained in a long time.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS

Preferred embodiments of the present invention are described hereinafter with reference to the accompanying drawings.

Figure 1:
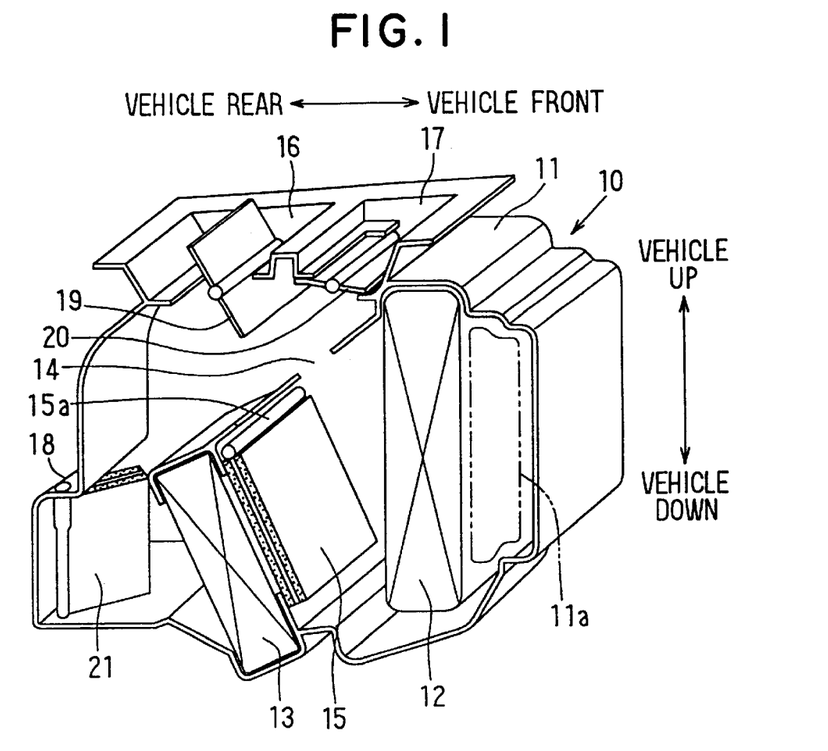
FIG. 1 is a schematic perspective view showing an air conditioner for a vehicle according to a first preferred embodiment of the present invention.

A first preferred embodiment of the present invention will be now described with reference to FIGS. 1–9B. An air conditioning unit 10 of an air conditioner for a vehicle is disposed in a passenger compartment at an approximately center portion of an instrument panel (not shown) in a vehicle width direction (i.e., right-left direction). The instrument panel is disposed in a front part of the passenger compartment of the vehicle. In the first embodiment, the air conditioning unit 10 is installed in the vehicle to correspond to an arrangement direction of FIG. 1. A blower unit (not shown) is disposed in the passenger compartment at a front passenger's side shifted from the air conditioning unit 10 in the vehicle width direction. As shown in FIG. 1, the air conditioning unit 10 has an air conditioning case 11 which forms an air passage for leading air toward the passenger compartment. An air inlet 11a through which air is introduced into the air conditioning case 11 is formed on a most front portion of the air conditioning case 11. An outlet of the blower unit is connected to the air inlet 11a of the air conditioning case 11, so that air blown by the blower unit flows into the air conditioning case 11 through the air inlet 11a. Air introduced into the air conditioning case 11 is cooled by an evaporator 12 of a refrigerant cycle, and then is heated by a heater core 13 which heats air using hot water (i.e., engine cooling water) as a heating source. An amount of air passing through the heater core 13 and an amount of air bypassing the heater core 13 are adjusted by a plate-like air mixing door 15 so that the temperature of air to be blown into the passenger compartment is adjusted to have a predetermined temperature.

The air mixing door 15 is rotated by a rotation shaft 15a in the air conditioning case 11. A ratio between an amount of air passing through the heater core 13 and an amount of air passing through a bypass passage 14 through which air bypasses the heater core 13 is adjusted by controlling a rotation position of the air mixing door 15. The conditioned air is blown into the passenger compartment through at least one of three opening portions formed in the air conditioning case 11. The three opening portions are a face opening 16 through which air is blown toward the head portion of a passenger in the passenger compartment, a defroster opening 17 through which air is blown toward an inner surface of a windshield of the vehicle, and a foot opening 18 through which air is blown toward the foot portion of the passenger.

The face opening 16, the defroster opening 17, and the foot opening 18 are opened and closed, respectively, by a face door 19, a defroster door 20, and a foot door 21. The face door 19 and the defroster door 20 are butterfly doors as shown in FIGS. 1, 2.

Figure 2:
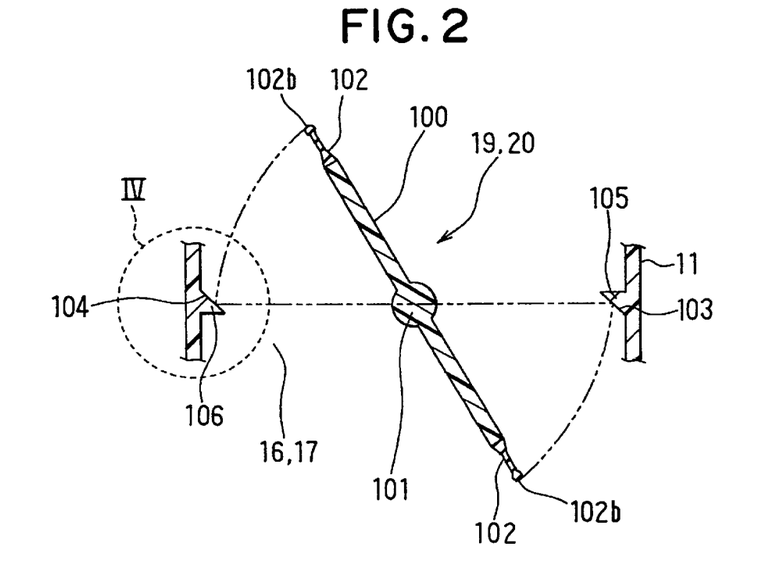
FIG. 2 is a schematic sectional view showing a butterfly door applied to the air conditioner in FIG. 1.
Figure 3:
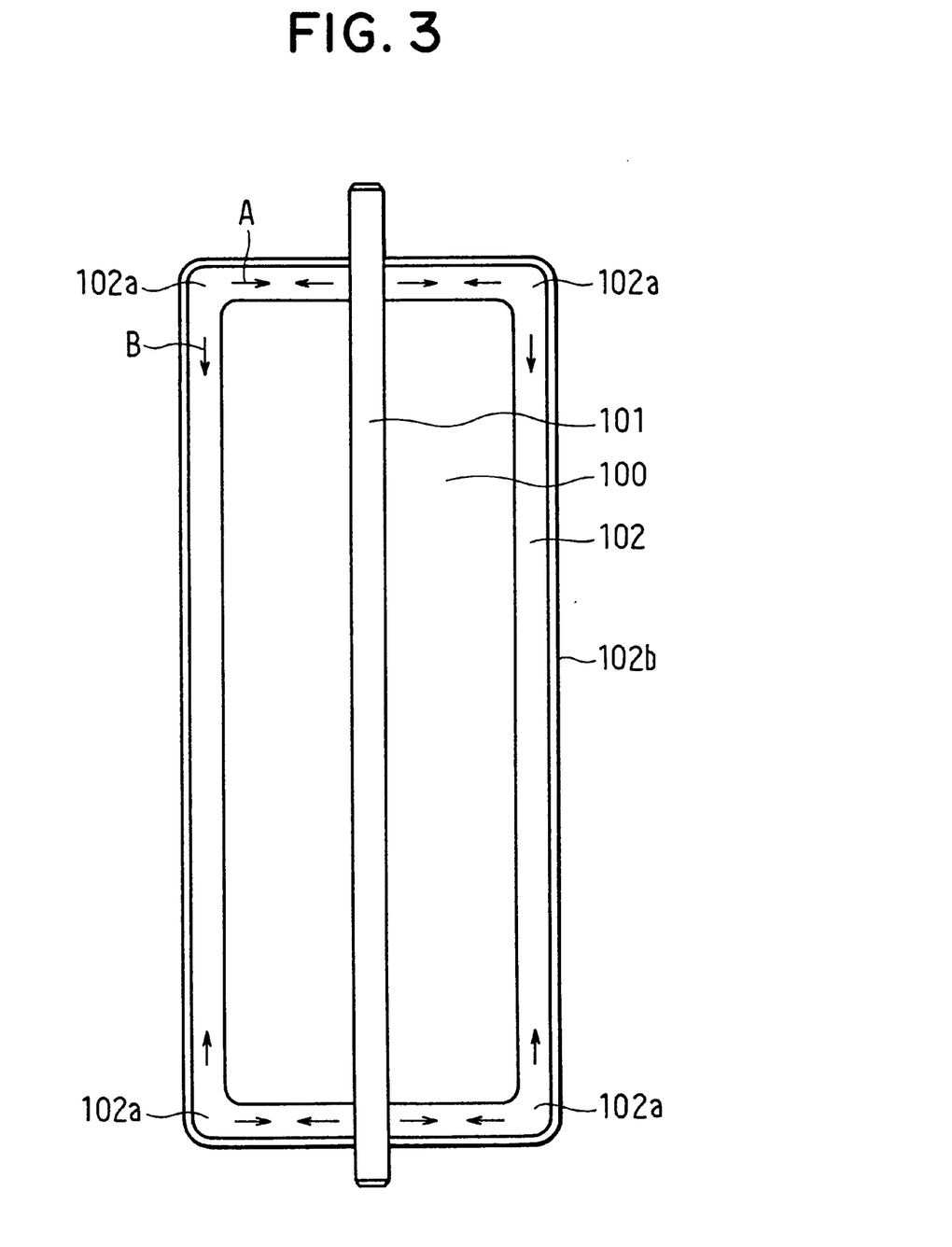
FIG. 3 is a top view showing the butterfly door according to the first embodiment.

Referring to FIGS. 2, 3, each of the butterfly doors 19, 20 has a door body 100 formed into an approximate rectangular shape using an inelastic material having a high rigidity, such as resin. A rotation shaft 101 for rotating the door body 100 is integrally formed with the door body 100 to extend in a longitudinal direction of the door body 100, and is disposed at a center of the door body 100 in a lateral direction of the door body 100. Hereinafter, both side ends of each door 19, 20 in the lateral direction are referred to as lateral side ends, and both side ends of each door 19, 20 in the longitudinal direction are referred to as longitudinal side ends.

A seal member 102 made of an elastic material is attached to an outer peripheral portion of the door body 100 in such a manner that the door body 100 is framed by the seal member 102. The seal member 102 is a lip-like seal sheet extending continuously outside from the outer peripheral portion of the door body 100. The door body 100 and the seal member 102 can be integrally formed, for example. For example, the door body 100 is molded beforehand, is inserted into a mold at a predetermined position, and thereafter, a melted elastic material for forming the seal material is injected into the mold, so that the door body 100 and the seal member 102 can be integrally formed.

The door body 100 of the door 19, 20 is made of a resin material such as polypropylene, nylon and ABS resin. A filler such as glass fiber may be mixed into the resin material of the door body 100 to enhance a strength of the door body 100. The seal member 102 is made of elastomer such as olefin elastomer of thermoplastic elastomer (TPE). The air conditioning case 11 may be made of the same resin material as that of the door body 100.

Referring to FIG. 2, the air conditioning case 11 has ribs 105, 106 protruding from the inner wall of the air conditioning case 11 at the positions forming the face and defroster openings 16, 17. The ribs 105, 106 respectively have an inclined seal surface 103, 104. Here, each of the face and defroster openings 16, 17 has a rectangular shape corresponding to each rectangular shape of the butterfly doors 19, 20. The rib 105 having the seal surface 103 and the rib 106 having the seal surface 104 are formed to be partitioned on right-left sides of the rotation shaft 101, using the rotation shaft 101 of the butterfly door 19, 20 as a boundary.

FIG. 2 shows an opening state of each butterfly door 19, 20. When operation force is applied to the rotation shaft 101 in a rotation direction so that the butterfly door 19, 20 is rotated by a predetermined rotation angle in the anticlockwise direction of FIG. 2, an outer peripheral end portion 102b of the seal member 102 of the butterfly door 19, 20 tightly contacts the seal surfaces 103, 104 of the ribs 105, 106 of each opening portion 16, 17. Therefore, the outer peripheral portion of the door body portion 100 can be sealed relative to the air conditioning case 11, and the opening portions 16, 17 of the air conditioning case 11 can be closed by the butterfly doors 19, 20. Here, the outer peripheral end portion 102b of the thin-plate like (i.e., flat sheet like) seal member 102 is press-fitted to the ribs 105, 106 of the air conditioning case 11 on both sides of a first end of the door body portion 100 parallel to the rotation shaft 101 and a second end thereof perpendicular to the rotation shaft 101. In the first embodiment of the present invention, a length of the first end of the door body portion 100 is larger than the second end of the door body portion 100. That is, the first end of the door body portion 100 corresponds to the longitudinal side ends of the door 19, 20, and the second end thereof corresponds to the lateral side ends of the door 19, 20.

Figure 4:
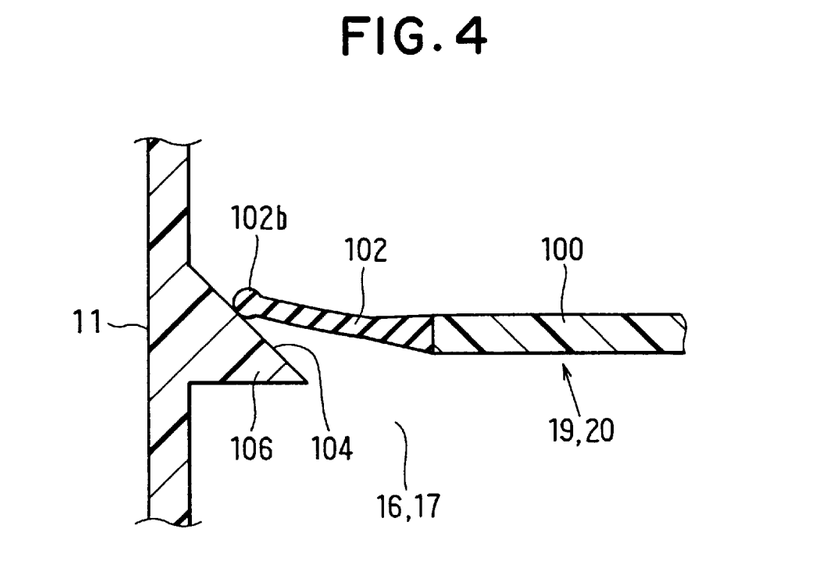
FIG. 4 is an enlarged view of a portion indicated by chain circle IV in FIG. 2 when the door contacts an air conditioning case according to the first embodiment.

FIG. 4 shows a state in which the outer peripheral end portion 102b of the sheet-like seal member 102 is pressfitted to the inclined seal surface 104 of the rib 106. The seal surfaces 103, 104 are formed to be inclined, so that a contacting-surface pressure between the seal member 102 and the air conditioning case 11 is increased. Therefore, sealing-effect for air-tightly sealing the openings 16, 17 of the air conditioning case 11 can be improved.

Both ends of the rotation shaft 101 of the door body portion 100 of the butterfly door 19, 20 are rotatably held in a shaft receiving hole (not shown) provided in the air conditioning case 11. One end of the rotation shaft 101 protrudes to the outer side of the air conditioning case 11, and is connected to a door driving unit (not shown). The door driving unit is a manual operation member provided on an operation panel of the vehicle air conditioner, or an actuator using a motor controlled by a control unit.

Figure 5:
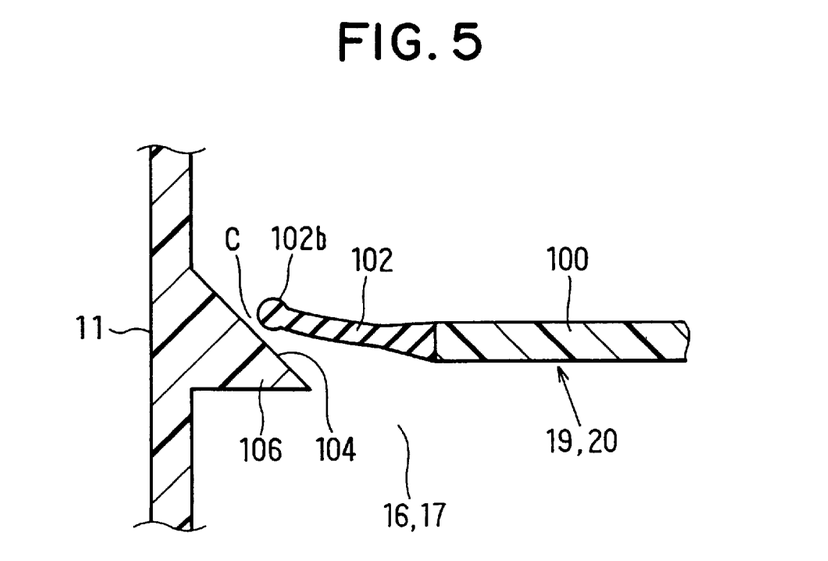
FIG. 5 is an enlarged view of a portion indicated by chain circle IV in FIG. 2 according to a comparison example.
Figure 6:
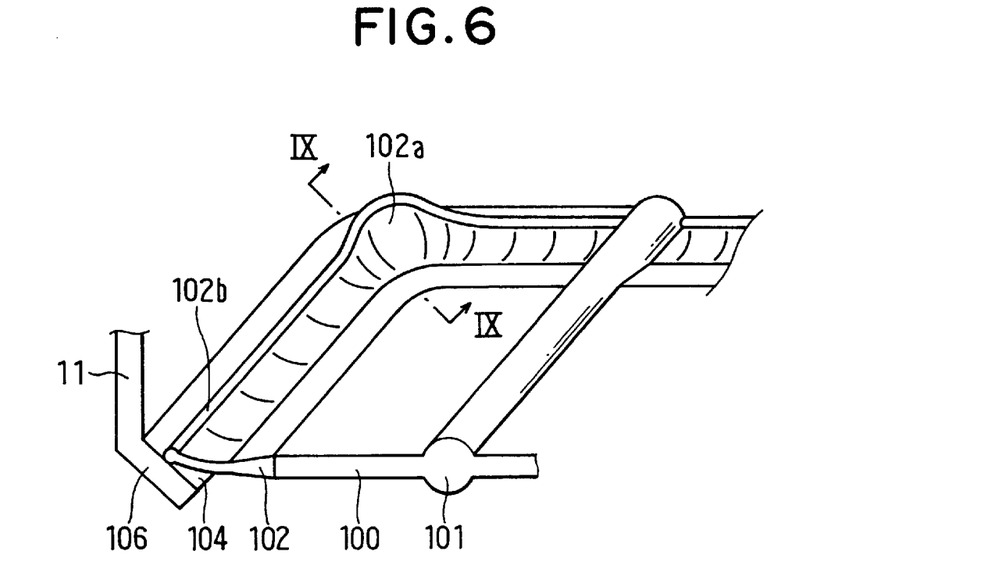
FIG. 6 is a partial perspective view showing the relationship between a corner portion of the butterfly door and a seal surface on the air conditioning case.

Next, a structure of the butterfly door 19, 20 for improving the seal performance will be described in detail. According to experiments of the inventors of the present invention, shrinking force toward an inner side (i.e., inner shrinking force) is generated in the seal member 102, as shown by arrow A, B in FIG. 3. Therefore, the seal member 102 on the corner portion 102a is deformed toward the door body portion 100, and is bent upwardly. Thus, a clearance "C" shown in FIG. 5 may be caused between the seal surface 104 (103) of the rib 106 and the seal member 102 on the corner portion 102a. As a result of studies by the inventors of the present invention, in this case, a curvature radius $R_{C1}$ of the seal surface 104 (103) of the rib 106 (105) on a corner is equal to or smaller than a curvature radius $R_D$ of an outer circular arc portion formed in the corner portion 102a of the seal member 102 (i.e., $R_{C1} \leq R_D$). For example, when $R_D=5$ mm, $R_{C1} \leq 5$ mm. Therefore, a recess is formed in the corner portion of the seal surface 104 (103) of the air conditioning case 11 due to the small curvature radius $R_{C1}$. Thus, by heat-contraction due to the shrinking force after molding and material performance of the elastomer, the corner portion 102a of the thin-plate like seal member 102 is deformed toward the door body portion 100. As a result, as shown in FIGS. 5, 9A, the outer peripheral end portion 102b of the seal member 102 is bent upwardly on the corner portion 102a, thereby causing the clearance "C" between the seal surface 104 (103) and the outer peripheral end portion 102b on the corner portion 102a. In the comparison example shown in FIGS. 8A, 9A, the seal member 104 (103) and the seal member 102 are set to have the relationship of $R_{C1} \leq R_D$ on the corner portion. The chain line "D" in FIGS. 7, 8A, 8B indicates a seal line where the outer peripheral end portion 102b of the seal member 102 is press-fitted to the seal surface 104 (103) of-the air conditioning case 11.

To prevent the clearance "C", in the first embodiment, the inner peripheral circular arc portion on the corner portion of the seal line "D" of the seal surface 104(103) is formed to have a curvature radius $R_{C2}$ which is larger than the curvature radius $R_D$ of the outer peripheral circular arc portion of the seal member 102 on the corner portion 102a. Therefore, when the doors 19, 20 closes the opening portions 16, 17, the seal member 102 is beforehand elastically deformed from an initial using time by a degree equal to or more than a deformation amount due to the inner shrinking force. That is, the deformation amount of the thin-plate like seal member 102 on the corner portion 102a toward the door body portion 100 is determined by the inner shrinking force of the seal member 102 and the rigidity of the seal member 102.

Figure 7:
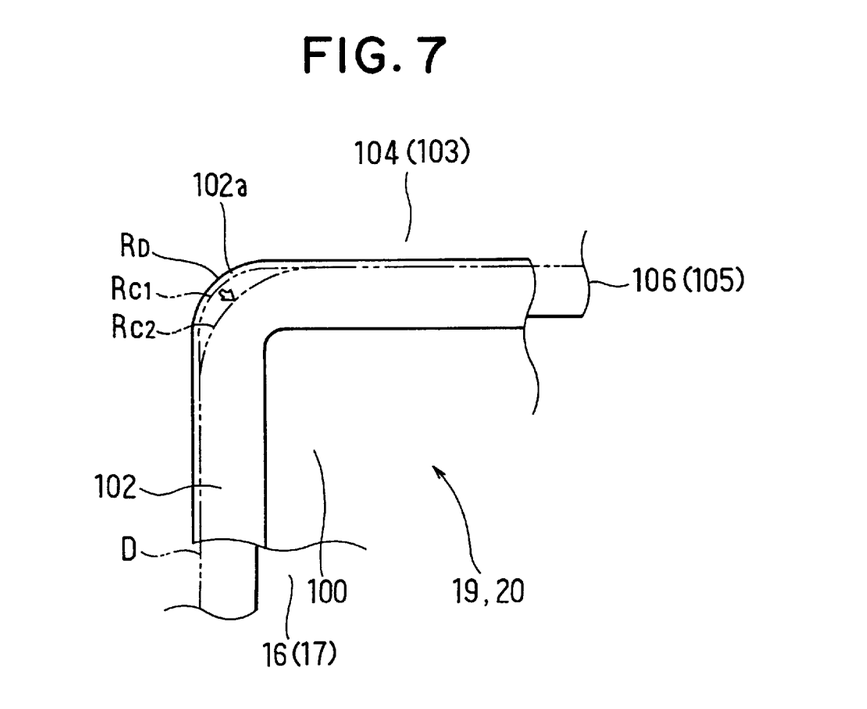
FIG. 7 is a top plan view for explaining a main portion of the first embodiment.
Figure 8A:
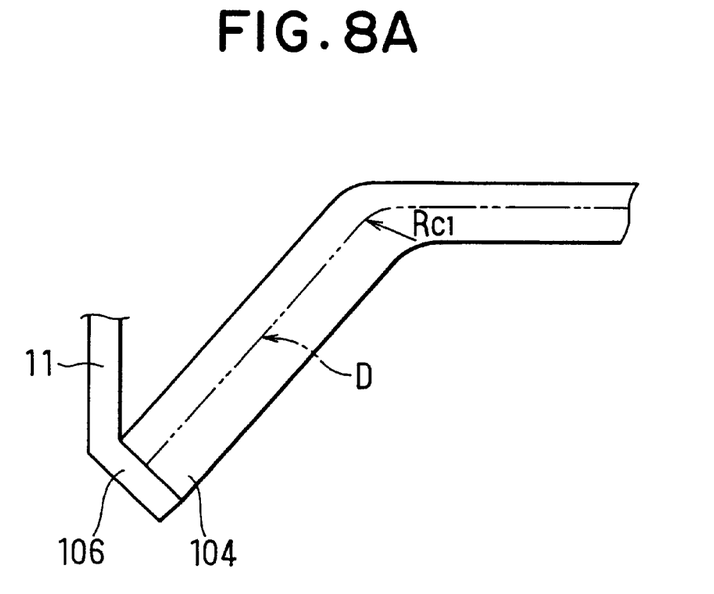
FIG. 8A is a partial perspective view of a seal surface on an air conditioning case of a comparison example.
Figure 8B:
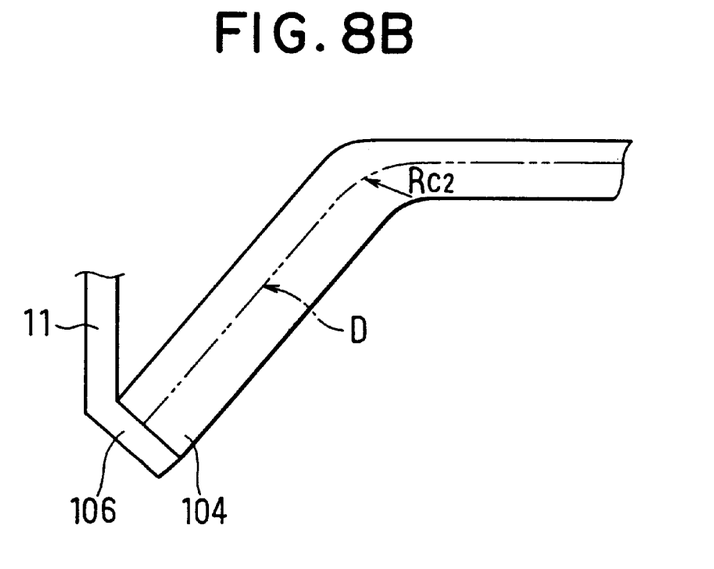
FIG. 8B is a partial perspective view of the seal surface on the air conditioning case according to the first embodiment.
Figures 9A, 9B:
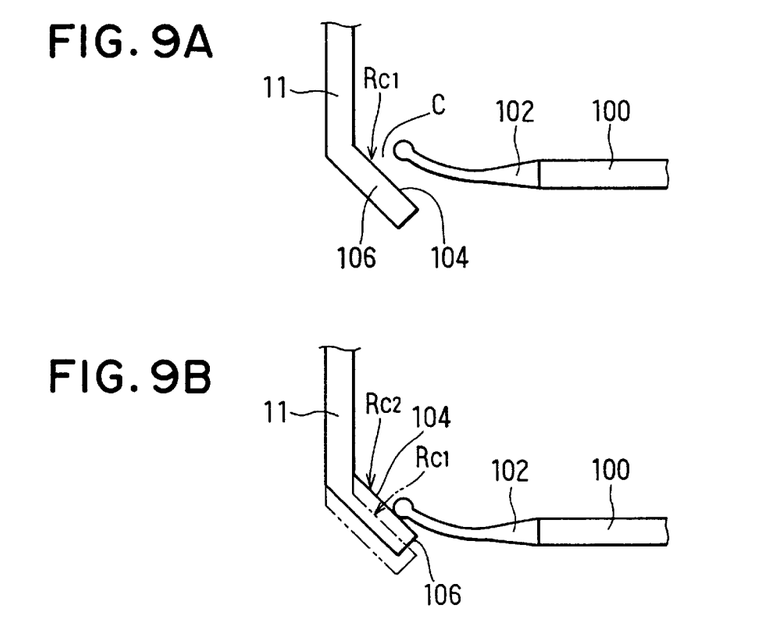
FIG. 9A is a cross-sectional view taken along line IX—IX in FIG. 6 according to the comparison example.
FIG. 9B is a cross-sectional view taken along line IX—IX in FIG. 6 according to the first embodiment.

According to the first embodiment of the present invention, the curvature radius $R_{C2}$ of the inner peripheral circular arc portion of the seal surface 104 (103) on the corner portion of the seal line "D" is set to be larger than the curvature radius $R_D$ of the outer peripheral circular arc portion of the corner portion 102a of the seal member 102, as shown in FIGS. 7, 8B, 9B, so that the seal member 102 tightly contacts the inner peripheral circular arc portion of the corner portion of the seal surface 104(103). As a result, the corner portion 102a of the thin-plate like seal member 102 can be elastically deformed from the initial using time by a deformation amount equal to or more than the deformation amount due to the inner shrinking force of the seal member 102. Accordingly, even when the corner portion 102a of the seal member 102 is deformed by the inner shrinking force of the corner portion 102a of the seal member 102, the clearance "C" is not caused when the doors 19, 20 closes the openings 16, 17 of the air conditioning case 11.

As a result of experiments, the curvature radius $R_{C2}$ is preferably in a range of 1.5 $R_D$–4 $R_D$. By setting the curvature radius $R_{C2}$ to be 1.5 $R_D$ or larger than 1.5 $R_D$, the clearance "C" can be sufficiently prevented. On the other hand, when the curvature radius $R_{C2}$ is larger than 4 $R_D$, the inner peripheral circular arc portion of the corner portion of the seal surface 104 (103) greatly protrudes toward the side of the opening 16, 17, and an area of the opening 16, 17 is greatly reduced. Further, in this case, the inner peripheral circular arc portion of the corner portion of the seal surface 104 (103) may be close to the door body portion 100, and may be interfere with the door body portion 100. Thus, in the first embodiment, the curvature radius $R_{C2}$ is set to be 4 $R_D$ or smaller than 4 $R_D$.

Further, in the first embodiment of the present invention, when the curvature radius $R_{C2}$ is set in a range of 2 $R_D$–3 $R_D$, sufficient seal performance and operation performance of the door 19, 20 are obtained. For example, when the curvature radius $R_D$ is 5 mm, the curvature radius $R_{C2}$ is set in a range of 10–15 mm. Thus, according to the first embodiment of the present invention, the door 19, 20 can be produced in low cost because the seal member 102 is formed into the thin-plate like. Further, because the curvature radius $R_{C2}$ is set in the range of 1.5 $R_D$–4 $R_D$, the air leak due to the deformation of the thin-plate like seal member 102 can be prevented.

A second preferred embodiment of the present invention will be now described with reference to FIGS. 10A–14C. In the above-described first embodiment, the structure for preventing air leak on the corner portion due to the inner shrinking force of the thin-plate like seal member 102. However, in the second embodiment, the deformation of the corner portion 102a of the thin-plate like seal member 102 due to dynamical pressure of blown air is restricted. Since the dynamical pressure of air blown by the blower unit is applied to the thin-plate like seal member 102, the air leak may be caused in the corner portion 102a of the seal member 102.

Figure 10A:
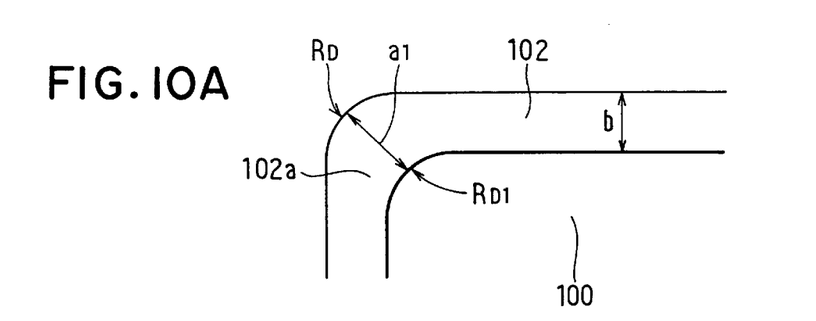
FIG. 10A is a top view of a seal member of a door of a first comparison example for explaining a second preferred embodiment of the present invention.
Figure 10B:
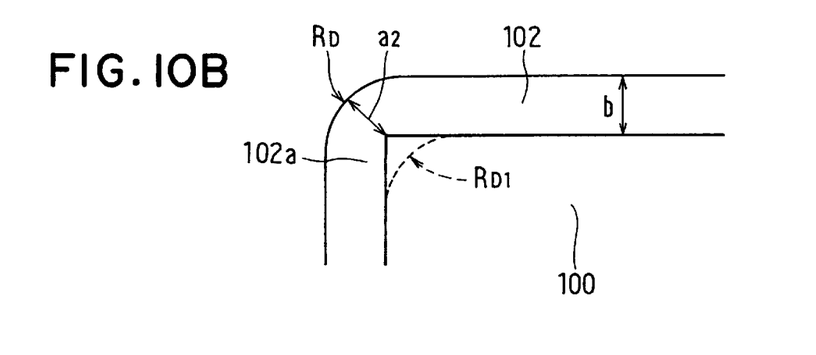
FIG. 10B is a top view of a seal member of a door of a second comparison example for explaining the second embodiment.
Figure 11:
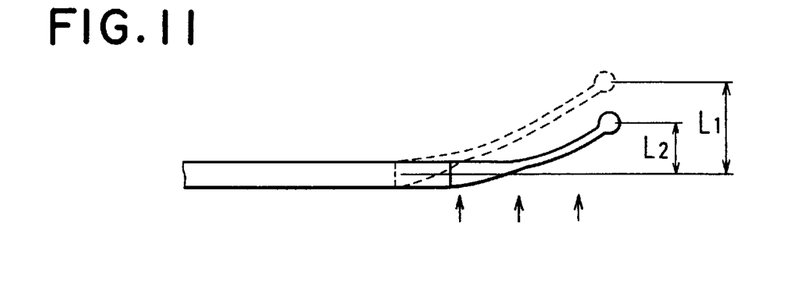
FIG. 11 is a view for explaining a deformation amount due to dynamical pressure.

FIG. 10A shows a corner portion 102a of the thin-plate like seal member 102 of a first comparison example, and FIG. 10B shows a corner portion 102a of the thin-plate like seal member 102 of a second comparison example. In the first comparison example, because the outer peripheral portion of the seal member 102 is approximately formed into a rectangular shape, the curvature radius $R_D$ of the outer peripheral circular arc portion of the corner portion 102a is a small value equal to a curvature radius $R_{D1}$ of an inner peripheral circular arc portion of the seal member 102 (i.e., $R_D = R_{D1}$). Thus, a protrusion dimension "a1" of the seal member 102 on the corner portion 102a is larger than a protrusion dimension "b" of the seal member 102 on a straight line portion except for the corner portion 102a. For example, when the protrusion dimension "b" of the seal member 102 on the straight line portion is 10 mm and when $R_D = R_{D1} = 5$ mm, the protrusion dimension "a1" of the seal member 102 on the corner portion 102a is 14.14 mm.

Generally, the bent deformation amount in an elastic body is in proportion to the third power (i.e., the cube) of the protrusion dimension relative to a certain load. Thus, when dynamical pressure of blown-air is applied to the corner portion 102a of the seal member 102, the corner portion 102a is greatly deformed in the direction where the dynamical pressure is applied. As shown by arrow in FIG. 11, when the dynamical pressure is applied to the seal member 102, the deformation amount of the corner portion 102a of the seal member 102, due to the dynamical pressure, is L1 which is greatly larger than the deformation amount L2 of the straight line portion, due to the dynamical pressure. As a result, air leak is caused by the deformation of the corner portion 102a due to the dynamical pressure.

On the other hand, in the second comparison example of FIG. 10B, an angle portion having a right angle, for example, is formed instead of the inner peripheral circular portion of the corner portion 102a. Therefore, the corner portion 102a of the seal member 102 has a reduced protrusion dimension "a2". However, due to the angle portion of the corner portion 102 on the inner peripheral side, the bent deformation of the seal member 102 is repeated with door opening/closing operation, and stress is collected in the angle portion of the seal member 102. Therefore, the seal member 102 is broken from the angle portion, and bonding performance between the seal member 102 and the door body portion 100 may deteriorated.

Figure 12:
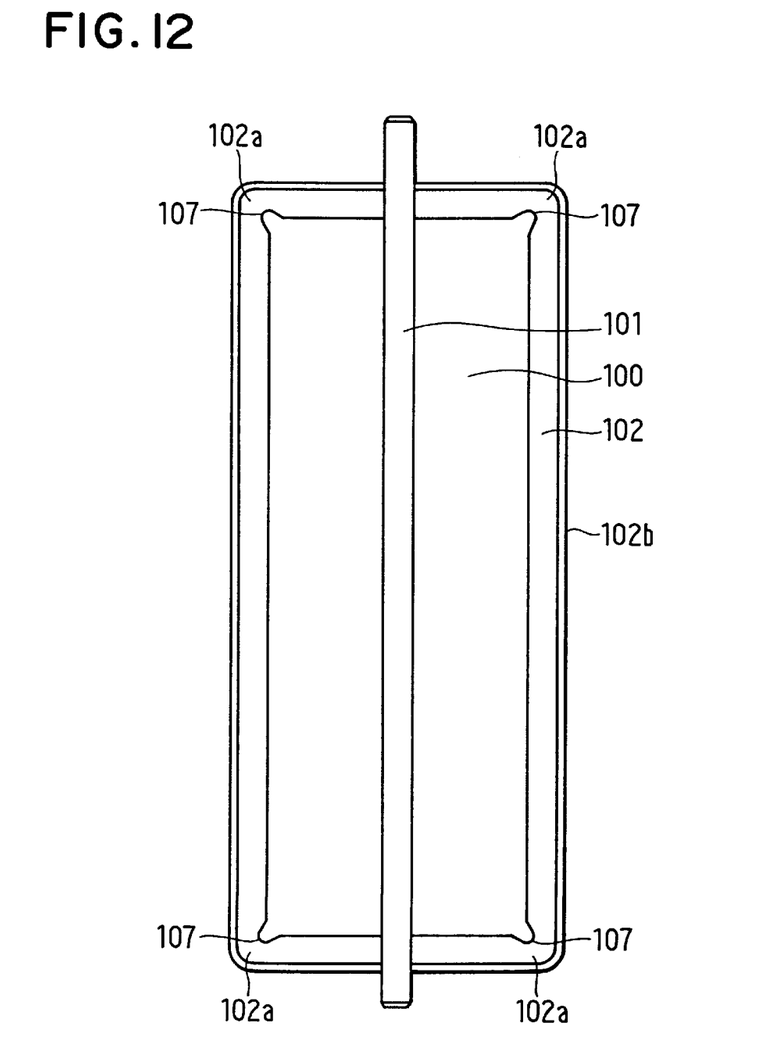
FIG. 12 is a top view showing a butterfly door according to the second embodiment.
Figure 13:
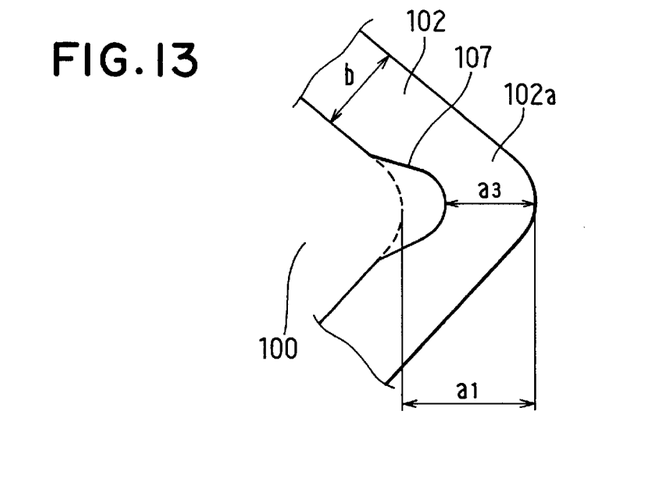
FIG. 13 is an enlarged view showing a main portion of the butterfly door according to the second embodiment.

To overcome this problem, in the second embodiment of the present invention, a protrusion portion 107 protruding toward the corner portion 102a of the seal member 102 is provided in the corner portion of the door body portion 100, so that the deformation of the corner portion 102a of the seal member 102 due to the dynamical pressure of blown-air is restricted. The protrusion portion 107 protrudes in a smooth curve shape (e.g., circular arc shape).

The protrusion amount of the protrusion portion 107 toward the corner portion 102a is set so that the protrusion dimension "a3" of the corner portion 102a of the seal member 102 is in a range of 0.5 b–1.1 b (i.e., a3=0.5 b–1.1 b), relative to the protrusion dimension "b". Here, the protrusion dimension "a3" is a distance between the top portion of the protrusion portion 107 and the outer peripheral circular arc portion of the corner portion 102a of the seal member 102.

By setting the dimension "a3" to be 1.1 b or lower than 1.1 b, the deformation amount of the corner portion 102a due to the dynamical pressure can be restricted to be approximately equal to the deformation amount L2 of the straight line portion of the seal member 102, thereby effectively preventing the air leak due to the dynamical pressure. On the other hand, when the dimension a3 is smaller than 0.5 b, the deformation amount of the corner portion 102 relative to a predetermined door A5 operation load is reduced, and seal performance is deteriorated. Therefore, in the second embodiment, the dimension "a3" is set to be 0.5 b or larger than 0.5 b. Thus, when the dimension "a3" is approximately equal to the dimension "b", a sufficient seal performance can be obtained.

According to the second embodiment of the present invention, the protrusion portion 107 protrudes in the smooth curve shape. Therefore, the inner peripheral surface of the corner portion 102a of the seal member 102 is not curved to have an angle portion as described in the comparison example 2, and stress with the door opening/closing operation is not collected. Thus, the bonding performance between the seal material 102 and the door body portion 100 can be maintained in a long time.

Further, according to the second embodiment of the present invention, the protrusion dimension "a3" of the corner portion 102a of the seal member 102 is set to be approximately equal to the protrusion dimension "b" of the straight line portion of the seal member 102, and the rigidity of the corner portion 102a of the seal member 102 is improved due to the addition of the protrusion portion 107 having a high rigidity. Therefore, it can prevent the corner portion 102a of the seal member 102 from being bent upwardly due to the inner shrinking force.

Figure 14A:
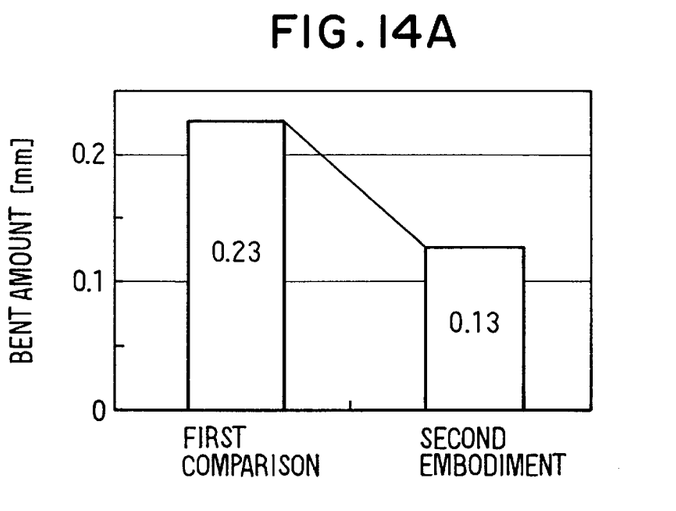
FIG. 14A is a view for explaining an effect of the second embodiment.
Figure 14B:
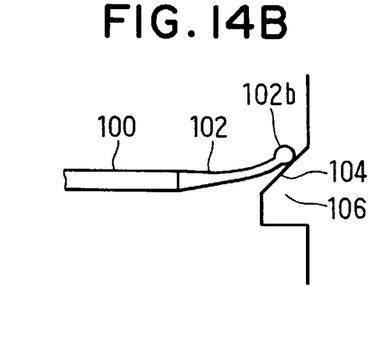
FIG. 14B is a view for explaining a state of a seal member of the butterfly door before being placed on a high temperature in an experiment.
Figure 14C:
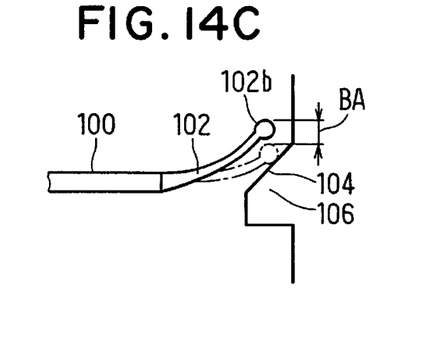
FIG. 14C is a view for explaining a state of the seal member of the butterfly door after being placed on a high temperature in the experiment.

FIG. 14A is a view for explaining the effect of the second embodiment of the present invention. In the first comparison example shown in FIG. 10A, b=10 mm, RD=RD1=5 mm, and a1=14.14 mm. On the other hand, in the second embodiment of the present invention, b=10 mm, the curvature radius of the protrusion portion 107 is 2 mm, RD=5 mm, and a3=10.07 mm. The other conditions such as the material of the seal member 102 are the same between the second embodiment of the present invention and the first example. FIG. 14B is a state before the seal member 102 is placed in a high temperature, and FIG. 14C is a state after the seal member 102 press-fitted to the seal surface 104 is placed in a high temperature of 80° C. for 24 hours. Here, the pressure difference between face and back sides of the door is 40 mmAg. As a result of experiments in the condition FIG. 14B, the upwardly bent amount of the first comparison example is 0.23 mm, and the upwardly bent amount of the second embodiment of the present invention is 0.13 mm, as shown in FIG. 14A. Further, in the first comparison example, the air leak flow amount from the corner portion 102a of the seal member 102 is 2.9 m³/h. However, in the same embodiment, the air leak flow amount from the corner portion 102a of the seal member 102 is 0.9 m³/h.

Although the present invention has been fully described in connection with preferred embodiments thereof with reference to the accompanying drawings, it is to be noted that various changes and modifications will become apparent to those skilled in the art.

For example, the present invention may be applied to an air mixing door for adjusting temperature of air blown into the passenger compartment. Further, the present invention is not limited to the air passage switching system of the air conditioner for the vehicle, but may be applied to an air passage switching system of various use.

In the above-described first and second embodiment, as shown in FIGS. 3, 12, the present invention is applied to the butterfly doors 19, 20 each having the rotation shaft 101 at a center portion of the door body portion 100. However, the present invention may be applied to a door such as the door 15 where the rotation shaft 15a is disposed at an end portion of the door body portion, when a lip-like seal member is attached to an outer peripheral end of a door body portion.

Such changes and modifications are to be understood as being within the scope of the present invention as defined by the appended claims.

What is claimed is:

1. An air passage switching system comprising:
   a case for forming an air passage through which air flows, said air passage having an opening;
   a door disposed in the case, for opening and closing said opening, said door including
      a door body made of a material having a rigidity higher than a predetermined value, and
      a seal member made of an elastic material having a heat shrinkage and being attached to an outer peripheral portion of said door body, said seal member continuously extending from the outer peripheral portion of said door body toward an outer side to have a thin plate-like shape, wherein:
   said case has a case seal surface around said opening;
   said seal member of said door is press-fitted to said case seal surface to have a predetermined deformation amount when said opening is closed;
   said seal member has inner stress generated during molding; and
   said seal member and said case seal surface are provided in such a manner that the predetermined deformation amount of said seal member when said seal member is press-fitted to said case seal surface is made larger than a deformation amount of said seal member due to the inner stress.

2. The air passage switching system according to claim 1, wherein:
   said seal member has a curved corner portion; and
   said seal member and said case seal surface are provided in such a manner that the deformation amount of said seal member when said seal member is press-fitted to said case seal surface is made larger than the deformation amount of said seal member due to the inner stress, on said corner portion.

3. The air passage switching system according to claim 2, wherein:
   said seal member has an outer peripheral curvature radius (RD) on said corner portion;
   said seal member is press-fitted to said case seal surface along a seal line when said opening is closed;
   said case seal surface has an inner peripheral curvature radius (RC2) on a corner portion of the seal line, corresponding to said corner portion; and
   the inner peripheral curvature radius (RC2) of said case seal surface is set to be larger than the outer peripheral curvature radius (RD) of said seal member.

4. The air passage switching system according to claim 3, wherein the inner peripheral curvature radius (RC2) of said case seal surface is set to be in a range of 1.5 RD–4 RD, relative to the outer peripheral curvature radius (RD) of said seal member.

5. The air passage switching system according to claim 1, wherein:
   said seal member has a corner portion; and
   said door body has a protrusion protruding toward said corner portion of said seal member.

6. The air passage switching system according to claim 1, wherein:
   said door has a rotation shaft for rotating said door body; and
   said rotation shaft extends in a longitudinal direction of said door.

7. An air passage switching system comprising:
   a case for forming an air passage through which air flows, said air passage having an opening;
   a door disposed in said case, for opening and closing said opening, said door including
      a door body made of a material having a rigidity higher than a predetermined value, and
      a seal member made of an elastic material and being attached to an outer peripheral portion of said door body, said seal member continuously extending from the outer peripheral portion of said door body toward an outer side to have a thin plate-like shape, wherein:
   said case has a case seal surface around said opening;
   said seal member of said door is press-fitted to said case seal surface when said opening is closed;
   said seal member has a corner portion; and
   said door body has a protrusion protruding toward said corner portion of said seal member.

8. The air passage switching system according to claim 7, wherein:
   said protrusion protruding toward said corner portion of said seal member has a curved outer surface.

9. The air passage switching system according to claim 7, wherein:

said door body has a straight line portion except for a corner portion;

said seal member extending from said straight line portion of said door body has a protrusion dimension (b); and said corner portion of said seal member extending from said protrusion of said door body has a protrusion dimension (a3), the protrusion dimension (a3) being in a range of 0.5 b–1.1 b relative to said protrusion dimension (b).

10. The air passage switching system according to claim 7, wherein:

said seal member has an outer peripheral curvature radius ($R_D$) on said corner portion;

said seal member is press-fitted to said case seal surface along a seal line when said opening is closed;

said case seal surface has an inner peripheral curvature radius ($R_{C2}$) on the corner portion of the seal line; and the inner peripheral curvature radius ($R_{C2}$) of said case seal surface is set to be larger than the outer peripheral curvature radius ($R_D$) of said seal member.

11. The air passage switching system according to claim 10, wherein the inner peripheral curvature radius ($R_{C2}$) of said case seal surface is set to be in a range of 1.5 $R_D$–4 $R_D$, relative to the outer peripheral curvature radius ($R_D$) of said seal member.

* * * * *